United States Patent
Ionita (10) Patent No.: US 10,217,009 B2
(45) Date of Patent: Feb. 26, 2019

(54) METHODS AND SYSTEMS FOR ENHANCING USER LIVENESS DETECTION

(71) Applicant: Mircea Ionita, Dublin (IE)

(72) Inventor: Mircea Ionita, Dublin (IE)

(73) Assignee: DAON HOLDINGS LIMITED, George Town (KY)

(*) Notice: Subject to any disclaimer, the term of this patent is extended or adjusted under 35 U.S.C. 154(b) by 192 days.

(21) Appl. No.: 15/231,863

(22) Filed: Aug. 9, 2016

(65) Prior Publication Data

US 2018/0046871 A1 Feb. 15, 2018

(51) Int. Cl.
*G06K 9/00* (2006.01)
*G06K 9/62* (2006.01)
*G06F 21/32* (2013.01)

(52) U.S. Cl.
CPC ......... *G06K 9/00906* (2013.01); *G06F 21/32* (2013.01); *G06K 9/00261* (2013.01); *G06K 9/00288* (2013.01); *G06K 9/00335* (2013.01); *G06K 9/6202* (2013.01); *G06K 9/6215* (2013.01)

(58) Field of Classification Search
CPC ............................. G06K 9/00228; G06K 9/36
See application file for complete search history.

(56) References Cited

U.S. PATENT DOCUMENTS

| | | | |
|---|---|---|---|
| 7,027,617 B1 | 4/2006 | Frishholz | |
| 7,630,522 B2 | 12/2009 | Popp et al. | |
| 8,457,367 B1 * | 6/2013 | Sipe | G06K 9/00221 |
| | | | 382/118 |
| 8,542,879 B1 * | 9/2013 | Nechyba | G06K 9/00228 |
| | | | 382/103 |
| 8,676,123 B1 * | 3/2014 | Hinkle | H04M 1/274508 |
| | | | 455/41.2 |
| 9,025,830 B2 | 5/2015 | Ma et al. | |
| 9,105,132 B2 * | 8/2015 | Thorn | G06T 15/20 |
| 9,137,246 B2 | 9/2015 | Parry et al. | |
| 9,202,105 B1 | 12/2015 | Wang et al. | |
| 9,392,460 B1 | 7/2016 | Blake et al. | |

(Continued)

FOREIGN PATENT DOCUMENTS

CN 201410483240.2 * 9/2014 ......... G06K 9/00288
EP 2 725 521 A2 4/2014

OTHER PUBLICATIONS

Foreign CN-201410483249.2 with Sep. 19 2014 publication date.*
European Search Report from EPO Application No. 17183890.7, dated Dec. 12, 2017, pp. 1-6.

*Primary Examiner* — Chan Park
*Assistant Examiner* — Mai Tran
(74) *Attorney, Agent, or Firm* — Kevin McDermott, Esq.

(57) ABSTRACT

A method for enhancing user liveness detection is provided that includes calculating, by a computing device, a first angle and a second angle for each frame in a video of captured face biometric data. The first angle is between a plane defined by a front face of the terminal device and a vertical axis, and the second angle is between the plane defined by the front face of the terminal device and a plane defined by the face of the user. Moreover, the method includes creating a first signal from the first angles and a second signal from the second angles, calculating a similarity score between the first and second signals, and determining the user is live when the similarity score is at least equal to a threshold score.

18 Claims, 6 Drawing Sheets

(56) References Cited

U.S. PATENT DOCUMENTS

| | | | |
|---|---|---|---|
| 9,395,562 B1* | 7/2016 | Nguyen | G02C 13/005 |
| 9,600,649 B2 | 3/2017 | Parry et al. | |
| 9,953,149 B2* | 4/2018 | Tussy | G06K 9/00288 |
| | | | 382/103 |
| 10,084,776 B2 | 9/2018 | Ionita et al. | |
| 2004/0234120 A1* | 11/2004 | Honda | G06T 7/0004 |
| | | | 382/145 |
| 2006/0206724 A1 | 9/2006 | Schaufele et al. | |
| 2007/0226509 A1* | 9/2007 | Senga | G06K 9/00221 |
| | | | 713/176 |
| 2008/0192980 A1 | 8/2008 | Park et al. | |
| 2009/0137286 A1* | 5/2009 | Luke | G06F 1/1626 |
| | | | 455/567 |
| 2009/0309698 A1 | 12/2009 | Headley et al. | |
| 2010/0149365 A1* | 6/2010 | Ishihara | G06K 9/00221 |
| | | | 348/222.1 |
| 2011/0254942 A1 | 10/2011 | Suzuki | |
| 2012/0027292 A1 | 2/2012 | Kozakaya et al. | |
| 2012/0036433 A1* | 2/2012 | Zimmer | G06T 15/20 |
| | | | 715/702 |
| 2012/0069308 A1* | 3/2012 | Satake | H04M 1/0272 |
| | | | 353/119 |
| 2013/0016882 A1 | 1/2013 | Cavallini | |
| 2013/0069988 A1* | 3/2013 | Kamei | G06F 1/1637 |
| | | | 345/658 |
| 2013/0188840 A1 | 7/2013 | Ma et al. | |
| 2013/0222236 A1* | 8/2013 | Gardenfors | G06F 1/1626 |
| | | | 345/156 |
| 2013/0254909 A1* | 9/2013 | Marengo | C12N 15/85 |
| | | | 800/13 |
| 2013/0329014 A1* | 12/2013 | Obata | H04M 1/72522 |
| | | | 348/46 |
| 2014/0009387 A1* | 1/2014 | Hwang | G06F 3/03 |
| | | | 345/156 |
| 2014/0016837 A1* | 1/2014 | Nechyba | G06K 9/00228 |
| | | | 382/118 |
| 2014/0270412 A1 | 9/2014 | Ma et al. | |
| 2014/0330900 A1* | 11/2014 | Libin | G06Q 10/10 |
| | | | 709/204 |
| 2014/0347397 A1* | 11/2014 | Wu | G06F 3/012 |
| | | | 345/650 |
| 2015/0033305 A1 | 1/2015 | Shear et al. | |
| 2015/0104081 A1 | 4/2015 | Ionita | |
| 2015/0128075 A1* | 5/2015 | Kempinski | G06F 3/012 |
| | | | 715/765 |
| 2015/0169943 A1* | 6/2015 | Khitrov | G06K 9/00288 |
| | | | 382/116 |
| 2015/0264567 A1* | 9/2015 | Sensharma | H04W 12/06 |
| | | | 455/411 |
| 2016/0026782 A1 | 1/2016 | Smowton et al. | |
| 2016/0035096 A1* | 2/2016 | Rudow | G01S 19/25 |
| | | | 348/135 |
| 2016/0063235 A1 | 3/2016 | Tussy | |
| 2016/0182503 A1 | 6/2016 | Cheng et al. | |
| 2016/0188958 A1 | 6/2016 | Martin | |
| 2016/0294824 A1 | 10/2016 | Sezille | |
| 2016/0300099 A1* | 10/2016 | Xiaolu | G06F 3/012 |
| 2016/0353018 A1* | 12/2016 | Anderson | H04N 5/23222 |
| 2016/0373647 A1* | 12/2016 | Garcia Morate | H04N 5/23222 |
| 2017/0063852 A1 | 3/2017 | Azar et al. | |
| 2017/0193215 A1 | 7/2017 | Parry et al. | |
| 2017/0262961 A1* | 9/2017 | Ekambaram | G09G 5/346 |
| 2017/0308738 A1* | 10/2017 | Zhang | G06K 9/00288 |
| 2017/0310898 A1 | 10/2017 | Misawa et al. | |
| 2018/0046852 A1* | 2/2018 | Ionita | G06K 9/00288 |
| 2018/0046871 A1* | 2/2018 | Ionita | G06K 9/00906 |
| 2018/0173979 A1 | 6/2018 | Fan | |

* cited by examiner

METHODS AND SYSTEMS FOR ENHANCING USER LIVENESS DETECTION

BACKGROUND OF THE INVENTION

This invention relates generally to user liveness detection, and more particularly, to methods and systems for enhancing user liveness detection.

Users conduct transactions with service providers in person and remotely over the Internet. Network-based transactions conducted over the Internet may involve purchasing items from a merchant website or accessing confidential information from a website. Service providers that own and operate such websites typically require successfully authenticating a user before allowing that user to conduct a desired transaction.

Typically, during network-based biometric authentication transactions conducted with a user at a remote location, the user requesting authentication provides a claim of identity and biometric data. However, imposters have been known to impersonate users by providing a false claim of identity supported by fraudulent biometric data in an effort to deceive a service provider into concluding the imposter is the person he or she claims to be. Such impersonations are known as spoofing.

Impostors have been known to use many methods to obtain or create fraudulent biometric data of others that can be submitted during authentication transactions. For example, imposters have been known to obtain two-dimensional pictures from social networking sites which can be presented to a camera during authentication to support a false claim of identity. Imposters have also been known to make physical models of a biometric modality, such as a fingerprint using gelatin or a three-dimensional face using a custom mannequin. Moreover, imposters have been known to eavesdrop on networks during legitimate network-based biometric authentication transactions to surreptitiously obtain genuine biometric data. The imposters use the obtained biometric data for playback during fraudulent network-based authentication transactions. Such fraudulent biometric data are difficult to detect using known liveness detection methods. Consequently, accurately conducting network-based biometric authentication transactions with biometric data captured from a user at a remote location depends on verifying the physical presence of the user during the authentication transaction as well as accurately verifying the identity of the user with the captured biometric data. Verifying that the biometric data presented during a network-based biometric authentication transaction conducted at a remote location is from a live person at the remote location, is known as liveness detection or anti-spoofing.

Liveness detection methods have been known to use structure derived from motion of a biometric modality, such as a face, to distinguish a live user from a photographic image. Other methods have been known to detect sequential images of eyes or eye blink techniques, to determine if face biometric data is from a live user. However, such methods may not detect spoofing attempts that use high definition video playback to present fraudulent biometric data, and therefore do not provide high confidence liveness detection support for entities dependent upon accurate biometric authentication transaction results.

BRIEF DESCRIPTION OF THE INVENTION

In one aspect, a method for enhancing user liveness detection is provided that includes calculating, by a computing device, a first angle and a second angle for each frame in a video of captured face biometric data. The first angle is between a plane defined by a front face of the terminal device and a vertical axis, and the second angle is between the plane defined by the front face of the terminal device and a plane defined by the face of the user. Moreover, the method includes creating a first signal from the first angles and a second signal from the second angles, calculating a similarity score between the first and second signals, and determining the user is live when the similarity score is at least equal to a threshold score.

In another aspect, a terminal device for enhancing user liveness detection is provided that includes a processor and a memory. The memory is configured to store data and the terminal device is associated with a network. The memory is in communication with the processor and has instructions stored thereon which, when read and executed by the processor, cause the terminal device to calculate a first angle and a second angle for each frame in a video of captured face biometric data. The first angle is between a plane defined by a front face of the terminal device and a vertical axis, and the second angle is between the plane defined by the front face of the terminal device and a plane defined by the face of the user. Moreover, the instructions when read and executed by the processor, cause the terminal device to create a first signal from the first angles and a second signal from the second angles, calculate a similarity score between the first and second signals, and determine the user is live when the similarity score is at least equal to a threshold score.

In yet another aspect, a computer program recorded on a non-transitory computer-readable recording medium is included in a terminal device for enhancing user liveness detection, the computer program being comprised of instructions, which when read and executed by the terminal device, cause the terminal device to calculate a first angle and a second angle for each frame in a video of captured face biometric data. The first angle is between a plane defined by a front face of the terminal device and a vertical axis, and the second angle is between the plane defined by the front face of the terminal device and a plane defined by the face of the user. Moreover, the instructions when read and executed by the terminal device cause the terminal device to create a first signal from the first angles and a second signal from the second angles, calculate a similarity score between the first and second signals, and determine the user is live when the similarity score is at least equal to a threshold score.

DETAILED DESCRIPTION OF THE INVENTION

Figure 1:
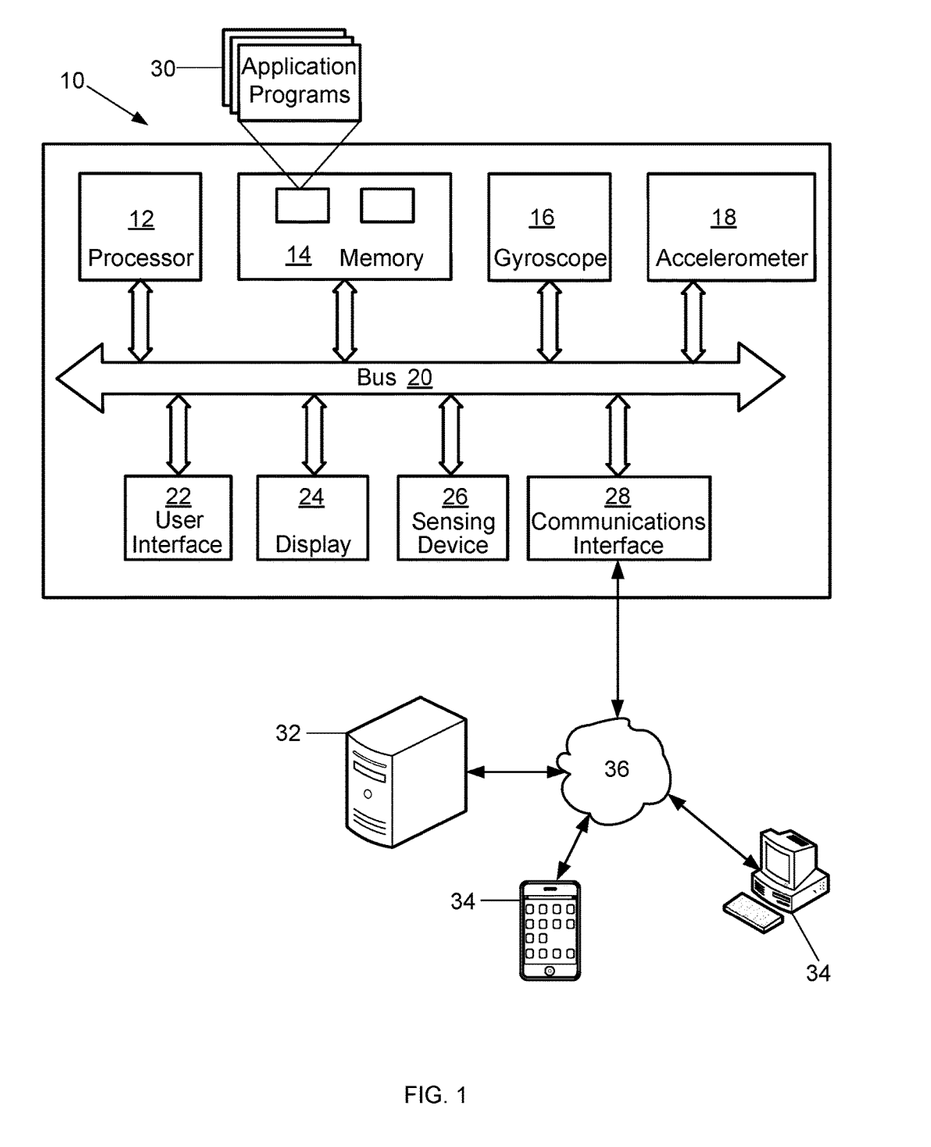
FIG. 1 is a block diagram of an example terminal device used for enhancing user liveness detection.

FIG. 1 is a block diagram of an example terminal device 10 used for enhancing user liveness detection. The terminal device 10 includes one or more processors 12, a memory 14, a gyroscope 16, one or more accelerometers 18, a bus 20, a user interface 22, a display 24, a sensing device 26 and a communications interface 28. The terminal device 10 may be any device capable of at least capturing and processing biometric data from users, and performing the functions described herein. One example of the terminal device 10 is a smart phone. Other examples of the terminal device 10 include, but are not limited to, a cellular phone, a tablet computer, a phablet computer, a laptop computer, a personal computer (PC), and any type of device having wired or wireless networking capabilities such as a personal digital assistant (PDA).

The processor 12 executes instructions, or computer programs, stored in the memory 14. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing the functions described herein. The above examples are exemplary only, and are thus not intended to limit in any way the definition and/or meaning of the term "processor." General communication between the components in the terminal device 10 is provided via the bus 20.

As used herein, the term "computer program" is intended to encompass an executable program that exists permanently or temporarily on any computer-readable recordable medium that causes the terminal device 10 to perform at least the functions described herein. Application programs 30, also known as applications, are computer programs stored in the memory 14. Application programs 30 include, but are not limited to, an operating system, an Internet browser application, enrollment applications, authentication applications, user liveness detection applications, face tracking applications, pre-trained machine learning algorithm applications, motion prediction applications, feature vector generator applications, and any special computer program that manages the relationship between application software and any suitable variety of hardware that helps to make-up a computer system or computing environment. Authentication applications enable the terminal device 10 to conduct verification and identification transactions with any type of authentication data. Machine learning algorithm applications include at least classifiers and regressors.

The memory 14 may be a computer-readable recording medium used to store data including, but not limited to, computer programs and user data records. The data record for each user may include record biometric data, record biometric templates and personal data of the user. The record biometric data is raw biometric data processed to generate at least one record biometric template. The record biometric template is typically used to verify the identity of a user. During a verification transaction, a biometric template is generated from biometric data captured from a user. The generated biometric template is compared against the corresponding user record biometric template, and if the generated and record templates match, the identity of the user is verified as true. Instead of using the generated template, the captured biometric data may be compared against the corresponding user record biometric data.

Personal data includes any demographic information regarding a user including, but not limited to, a user's name, gender, age, date-of-birth, address, citizenship and marital status. Each data record may also include any kind of data that may be used to enhance the trustworthiness of user liveness detection results and authentication transaction results. The data records are typically for users associated with the terminal device 10.

Configurable policies for enrolment and authentication transactions, some of which may be used to determine enrolment requirements and authentication data requirements, respectively, may also be stored in the memory 14. An enrolment data requirement is the data desired to be captured from users during enrolment. An authentication data requirement is the authentication data desired to be captured from users during either a verification or identification transaction. The record biometric data, the enrolment requirements, and the authentication data requirements may require any biometric modality be used as a basis of enrolment and/or authentication such as, but not limited to, voice, face, finger, iris, palm, and electrocardiogram. Moreover, such biometric modalities may include any combination of biometric modalities, and may take any form such as, but not limited to, audio recordings, photographs, and video. For the example methods and systems described herein, the authentication data requirement is for face biometric data captured as a video. A video includes a sequence of frames.

When the biometric modality is face, the terminal device 10 captures face biometric data as a video, extracts frames from the video, and assigns a time stamp to each frame in the video. The data for each frame may be stored in the memory 14 with other data calculated by the terminal device 10 for each frame. Thus, for each frame, all the frame data as stored in the memory 14 may be associated with other data calculated for the frame. The captured face biometric data includes at least facial image data, while the other data includes at least angles of the terminal device 10 calculated while the terminal device 10 is moved during biometric data capture.

The enrolment and authentication data requirements may be any type of authentication data, or any combination of different types of authentication data, for example, Global Positioning Coordinates and biometric data, and may be determined in any manner. The enrolment and authentication data requirements may alternatively be determined by an individual or by any system 32 or device 34 configured to communicate with the terminal device 10 over a network 36.

The memory 14 may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like. Furthermore, the memory 14 may include smart cards, SIMs or any other medium from which a computing device can read computer programs, applications or executable instructions.

The gyroscope 16 and the accelerometer 18 generate data regarding rotation and translation of the terminal device 10 that may be communicated to the processor 12 and the memory 14 via the bus 20. The processor 12 may use the generated data to calculate the orientation and position of the terminal device 10, calculate signals, and calculate the similarity between signals.

The user interface 22 and the display 24 allow interaction between a user and the terminal device 10. The display 24 may include a visual display or monitor that displays information to a user. For example, the display 24 may be a Liquid Crystal Display (LCD), active matrix display, plasma display, or cathode ray tube (CRT). The user interface 22 may include a keypad, a keyboard, a mouse, an infrared light source, a microphone, cameras, and/or speakers. Moreover, the user interface 22 and the display 24 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the device 10 to enter data, change settings, control functions, etc. Consequently, when the touch screen is touched, the user interface 22 communicates this change to the processor 12, and settings can be changed or user entered information can be captured and stored in the memory 14.

The sensing device 26 may include Radio Frequency Identification (RFID) components or systems for receiving information from other devices. The sensing device 26 may also include components with Bluetooth, Near Field Communication (NFC), infrared, or other similar capabilities. The terminal device 10 may alternatively not include the sensing device 26.

The communications interface 28 provides the terminal device 10 with two-way data communications. Moreover, the communications interface 28 enables the terminal device 10 to conduct wireless communications such as cellular telephone calls and to wirelessly access the Internet over the network 36. By way of example, the communications interface 28 may be a digital subscriber line (DSL) card or modem, an integrated services digital network (ISDN) card, a cable modem, or a telephone modem to provide a data communication connection to a corresponding type of telephone line. As another example, the communications interface 28 may be a local area network (LAN) card (e.g., for Ethernet™ or an Asynchronous Transfer Model (ATM) network) to provide a data communication connection to a compatible LAN. As yet another example, the communications interface 28 may be a wire or a cable connecting the terminal device 10 with a LAN, or with accessories such as biometric capture devices. Further, the communications interface 28 may include peripheral interface devices, such as a Universal Serial Bus (USB) interface, a PCMCIA (Personal Computer Memory Card International Association) interface, and the like. Thus, it should be understood that the communications interface 28 may enable the terminal device 10 to conduct any type of wireless or wired communications such as, but not limited to, accessing the Internet. Although the terminal device 10 includes a single communications interface 28, the terminal device 10 may alternatively include multiple communications interfaces 28.

The communications interface 28 also allows the exchange of information across the network 36. The exchange of information may involve the transmission of radio frequency (RF) signals through an antenna (not shown). Moreover, the exchange of information may be between the terminal device 10 and any other computer systems 32 and any other computing devices 34 capable of communicating over the network 36. The network 36 may be a 5G communications network. Alternatively, the network 36 may be any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 36 may also be any type of wired network or a combination of wired and wireless networks.

Other computer systems 32 that the terminal device 10 may communicate with include computer systems of service providers such as, but not limited to, financial institutions, medical facilities, national security agencies, and merchants. Other computing devices 34 that the terminal device 10 may communicate with include, but are not limited to, smart phones, tablet computers, phablet computers, laptop computers, personal computers and cellular phones. The computing devices 34 may be associated with any individual or with any type of entity including, but not limited to, commercial and non-commercial entities. The terminal device 10, the computer system 32, and each computing device 34 may alternatively be referred to as a computing device and/or a computing system.

Figure 2:
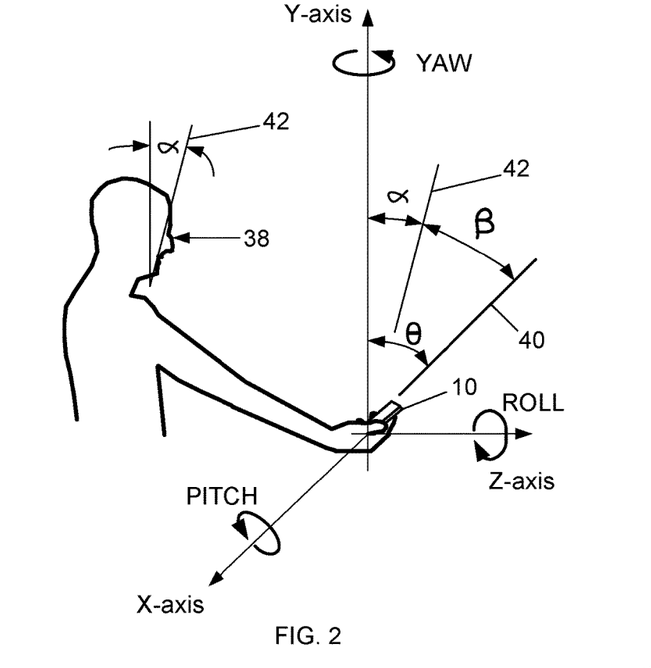
FIG. 2 is a side view of a user operating the example terminal device in which the terminal device is in a first position.

FIG. 2 is a side view of a person 38 operating the terminal device 10 in which the terminal device 10 is in a first position. The first position is the position in which a person naturally holds the terminal device 10 when starting to capture biometric data from his or her self. Because people have different natural tendencies, the first position of the terminal device 10 is typically different for different people. A person different from the person 38 may alternatively operate the terminal device 10 to capture biometric data from the person 38. Any person operating the terminal device 10 may be referred to herein as a user.

A three-dimensional Cartesian coordinate system having X, Y, and Z-axes is mathematically superimposed on the terminal device 10. The coordinate system may be mathematically positioned in any manner on the terminal device 10 to enhance detecting user liveness as described herein. The coordinate system represents the three-dimensional space through which the terminal device 10 may freely move.

The terminal device 10 may be rotated about any combination of the X, Y, and Z-axes, and may be translated along any combination of the X, Y, and Z-axes. Rotation of the terminal device 10 about the X-axis is called pitch (i.e., pitch angle), rotation of the terminal device 10 about the Y-axis is called yaw (i.e., yaw angle), and rotation of the terminal device 10 about the Z-axis is called roll (i.e., roll angle). The terminal device 10 may also be simultaneously rotated about and translated along any combination of the X, Y and Z-axes in any manner.

A front face of the terminal device 10 defines a plane 40 and the face of the user 38 defines another plane 42. The plane 40 forms a first angle $\theta$ with respect to the Y-axis. The plane 42 forms an angle $\alpha$ with respect to a vertical axis, which is parallel to the Y-axis, and is included in the X, Y, and Z coordinate system. The planes 40 and 42 form an angle β. In the first position, the angles θ and β typically are different and the planes 40 and 42 typically are not parallel. When the angles θ and β are each about zero, the planes 40 and 42 are approximately parallel and the terminal device 10 is positioned to capture biometric data usable for generating trustworthy authentication transaction results. Alternatively, or additionally, biometric data captured while moving the terminal device 10 from the first to the second position may be used for generating trustworthy authentication results. Any frame or combination of frames from the captured biometric data video may be used to generate trustworthy authentication results.

Figure 3:
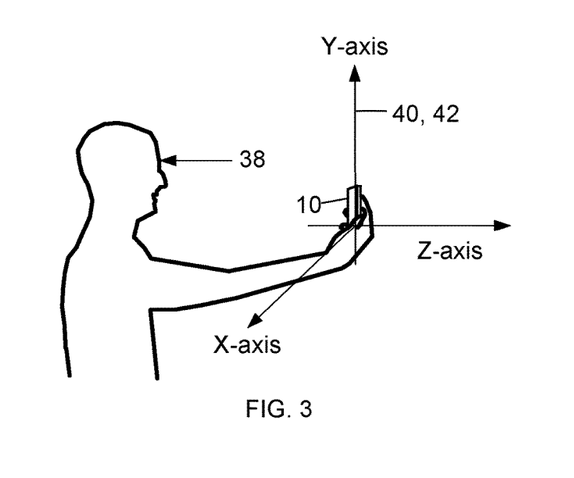
FIG. 3 is a side view of the user operating the example terminal device in which the terminal device is in a second position.

FIG. 3 is a side view of the user 38 operating the terminal device 10 in which the terminal device 10 is in a second position, the angles θ and β are each about zero, and the planes 40 and 42 are approximately aligned with the Y-axis. The angles θ and β may also be zero and the planes 40 and 42 may also be coincident with the Y-axis. The terminal device 10 is also at about the same level as the head of the user.

Figure 4:
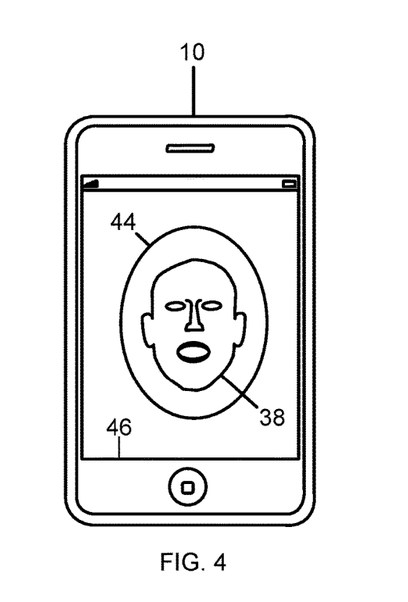
FIG. 4 is an enlarged front view of the example terminal device displaying an example visual aid and an image of the user within the visual aid.

FIG. 4 is an enlarged front view of the terminal device 10 displaying an example visual aid 44 and a facial image of the user 38 positioned within the visual aid 44. The visual aid 44 may be displayed by the terminal device 10 and functions as a guide that enables users to capture data usable for enhancing user liveness detection and generating trustworthy authentication transaction results. The example visual aid 44 is an oval. Alternatively, the visual aid 44 may be any shape defined by lines and/or curves including, but not limited to, a circle, a square, a rectangle, and an outline of the head of the user. However, it is not necessary that the visual aid 44 be displayed by the terminal device 10. The visual aid 44 may alternatively be a part of the terminal device 10 itself. For example, the visual aid 44 may be a perimeter 46 of the terminal device 10 display screen.

The displayed image of the user 38 is to be positioned within the visual aid 44 while capturing biometric data and moving the terminal device 10 from the first to the second position. The displayed image may be close to the visual aid 44 border but not outside the border. Staying within the visual aid 44 facilitates capturing biometric data usable in generating trustworthy authentication transaction results and enhancing user liveness detection. Alternatively, a small percentage of the facial image may be allowed to extend beyond the border of the visual aid 44 so long as trustworthy user liveness detection results may be calculated as described herein.

The user 38 starts capturing biometric data with the terminal device 10 when the device 10 is in the first position. Because the terminal device 10 cannot capture biometric data usable for generating trustworthy authentication results in the first position, a prompt is displayed by the terminal device 10 for the user to see. The prompt may be any information that causes the user to move the terminal device 10 into the second position. For example, the prompt may be an arrow pointing in the direction that the user is to move the terminal device 10, or a message instructing the user to move the terminal device 10 to be about level with the head of the user. Users typically move the terminal device 10 from the first to the second position in a manner that is natural to them. The user 38 may translate and rotate the terminal device 10 into the second position in any manner. For example, the user may change the distance between the terminal device 10 and the face of the user while moving the terminal device 10 into the second position. While moving the terminal device 10 into the second position, the user also positions his or her head to be more vertical.

The user may activate the terminal device 10 to cause the device 10 to start capturing biometric data, or the terminal device 10 may start capturing biometric data automatically. For example, the terminal device 10 may start capturing biometric data automatically when the prompt is displayed.

In response to the prompt, the user 38 moves the terminal device 10 into the second position. While moving the device 10, the user aims the terminal device 10 at his or her self, such that the image of his or her face displayed by the terminal device 10 is within the visual aid 44. While being aimed at the user, the terminal device continuously captures biometric data until the terminal device 10 is in the second position. The terminal device 10 stops capturing biometric data after the terminal device 10 is in the second position. The user may cause the terminal device 10 to stop capturing biometric data, or the terminal device 10 may stop capturing biometric data automatically when the angles θ and β are each zero or about zero. Biometric data for enhancing trustworthiness of authentication transaction results may be captured when the angles θ and β are each close to zero degrees, for example, between about minus five degrees and plus five degrees. Thus, it is not necessary that the angles θ and β be exactly zero to capture biometric data for enhancing the trustworthiness of authentication transaction results.

While capturing the biometric data as a video, the terminal device 10 generates data for each frame included in the captured video. The terminal device 10 calculates the angle θ for a frame from data generated by the accelerometer 18 and the gyroscope 16 for that frame. Alternatively, the angle θ may be calculated from data generated by only the accelerometer 18. A face pose detection algorithm application may be used to calculate the angle θ for a frame from the image data for that frame. Alternatively, any application that may cause the terminal device 10 to calculate the angle θ for a frame from the image data for that frame, or from any other data for that frame, may be used. An application may also cause the terminal device 10 to calculate the angle α for a frame by any means, for example, from the image data for that frame, and may calculate the angle θ based on the angles θ and α. The terminal device 10 may calculate the angles θ, α, and β for each frame while capturing the biometric data. Alternatively, the terminal device 10 may calculate the angles θ, α, and β for each frame after capturing the biometric data.

The terminal device 10 calculates an X component (i.e., $\theta_X$ and $\beta_X$), a Y-component (i.e., $\theta_Y$ and $\beta_Y$), and a Z-component (i.e., $\theta_Z$ and $\beta_Y$) for the angles θ and β in each frame. Due to the nature of the movement from the first to the second position, the most significant angular change occurs about the X-axis. Typically, there is less significant angular change about the Y and Z-axes. A significant angular change about the Y or Z-axes may be evidence the user has not moved the terminal device 10 in accordance with the prompt, so the calculated angles θ and β are deemed faulty and thus not usable for detecting user liveness. A significant angular change may be any angular change that enables detecting movement not in accordance with the prompt. For example, a significant angular change may be between five and ten degrees. The angular change may be measured with respect to the initial values of the angles θ (i.e., $\theta_x$, $\theta_y$) and β (i.e., βx, $\beta_y$) in the first position. Faulty data may also be detected using a face tracker application that analyzes face image data included in the captured biometric data to detect any anomalies. For example, an anomaly may be a bend detected in a photograph used by an imposter during a spoofing attempt. If any anomalies are detected, the calculated angular data (i.e., $\theta_x$, and $\beta_x$) are deemed faulty and not usable for detecting user liveness.

The X, Y, and Z-components of the angles $\theta$ and $\beta$ are plotted over time to generate a signal for each component. Thus, at least six signals may be generated. Signals generated from faulty angles $\theta$ and $\beta$ are also deemed faulty and cannot be used to detect user liveness.

Figure 5:
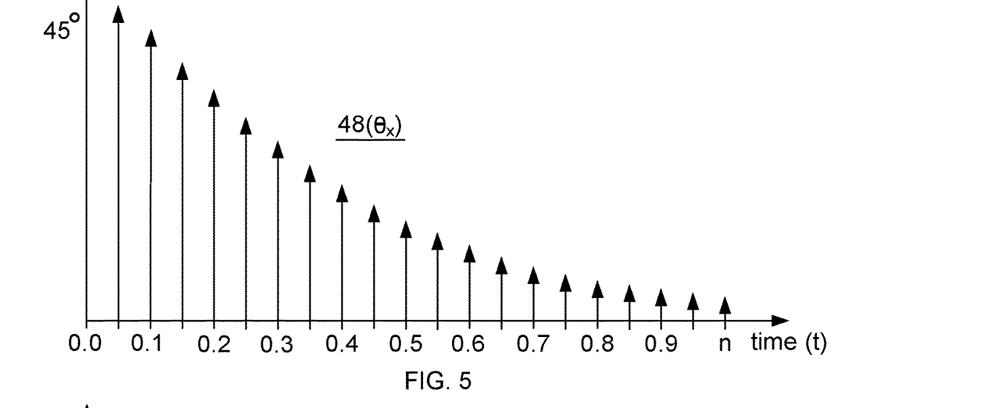
FIG. 5 is a diagram illustrating an example first signal for the X-component of a first angle.

FIG. 5 is a diagram illustrating an example first signal 48 for the X-component of the angle $\theta$ (i.e., $\theta_x$). The signal 48 is created by plotting the value of the angle $\theta_x$ for each frame in the video, as the terminal device 10 is moved from the first to the second position. The signal 48 is a discrete signal that represents the change in the angle $\theta_x$ over time. The time t=0.0 seconds corresponds to the time at which the user initiates moving the terminal device 10 from the first position to the second position. The time "n" indicates the time at which the signal 46 begins to exhibit asymptotic characteristics. For the example signal 48, n=1.0 second. However, the time "n" may vary based on how the terminal device 10 is moved from the first to the second position by the user. The value of $\theta_x$ at time t=0.0 seconds is forty-five degrees and at time t=n seconds is about zero degrees.

Twenty different values of $\theta_x$ are plotted to create the signal 48 which yields a frame rate of twenty frames per second. However, the frame rate, and consequently the number of $\theta_x$ values used to create the signal 48, may alternatively vary from a minimum of ten frames per second to a maximum of thirty frames per second. Frame rates between ten and thirty frames per second enable detecting user liveness as described herein.

Figure 6:
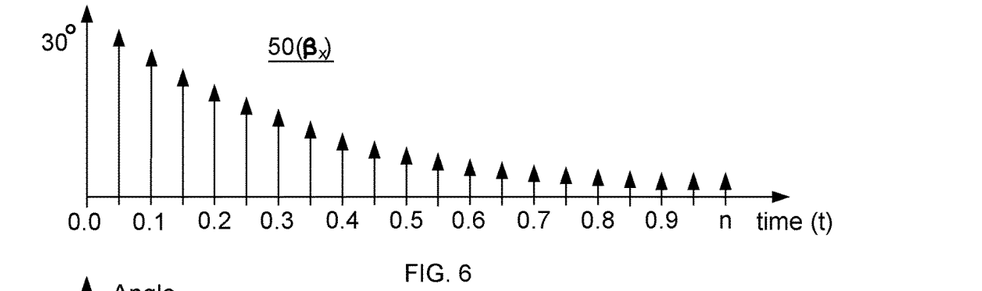
FIG. 6 is a diagram illustrating an example second signal for the X-component of a second angle.

FIG. 6 is a diagram illustrating an example second signal 50 for the X-component of the angle $\beta$ (i.e., $\beta_x$). The signal 50 is created by plotting the value of the angle $\beta_x$ versus time, as the terminal device 10 is moved from the first to the second position. The signal 50 is a discrete signal that represents the change in $\beta_x$ over time. The time t=0.0 seconds and t=n seconds, as well as the frame rate, are the same as for the example signal 48. Alternatively, the frame rate for the signal 50 may be different than the frame rate for the signal 48. The value of $\beta_x$ at time t=0.0 seconds is thirty degrees and at time t=n seconds is about the same as $\theta_x$, which is about zero degrees.

The values of the angles $\theta_x$ and $\beta_x$ at time t=0.0 seconds may vary depending on how the user holds the terminal device 10 in the first position when initiating movement of the terminal device 10. Although the angles $\theta_x$ and $\beta_x$ are forty-five and thirty degrees, respectively, in the first position as described herein, the angles $\theta_x$ and $\beta_x$ may alternatively be any angle in the first position that enhances user liveness detection as described herein. For example, the angle $\theta_x$ may be any angle between twenty and fifty-five degrees.

Figure 7:
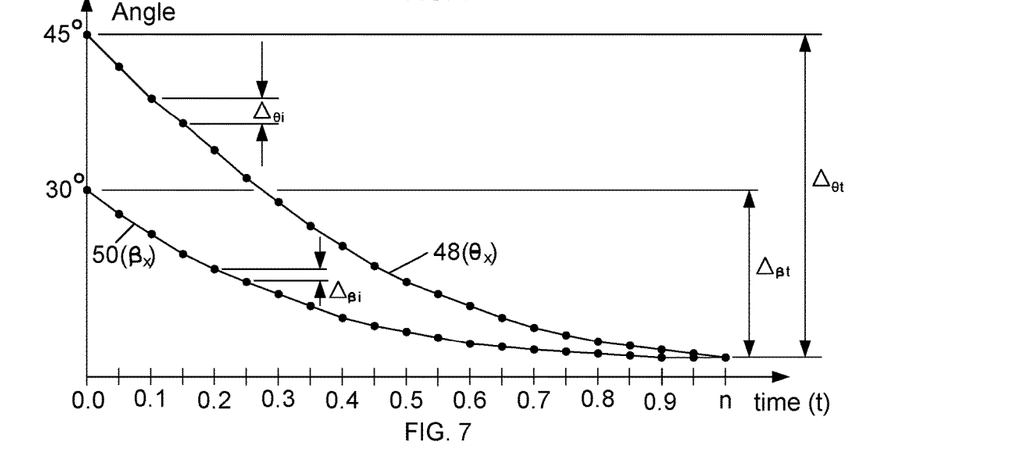
FIG. 7 is a diagram illustrating the signals as shown in FIGS. 5 and 6.

FIG. 7 is a diagram illustrating the signals 48 and 50 in which values of the angle $\theta_x$ at each time "t" have been plotted and sequential values have been connected with a line. Likewise, the values of the angle $\beta_x$ have been plotted and sequential values have been connected with a line. The signals 48 and 50 converge at around time t=n. The total change in the signal 48 is $\Delta_{\theta t}$ and the total change for the signal 50 is $\Delta_{\beta t}$. Moreover, the incremental change for signal 48 is $\Delta_{\theta i}$ and the incremental change for the signal 50 is $\Delta_{\beta i}$.

The total change $\Delta_{\theta t}$ between time t=0 and t=n is about forty-five degrees, and the total change $\Delta_{\beta t}$ between time t=0 and t=n is about thirty degrees. Large incremental changes $\Delta_{\theta i}$ and $\Delta_{\beta i}$ in the signals 48 and 50, respectively, between sequential frames may be evidence of a spoof attack. Incremental changes $\Delta_{\theta i}$ and $\Delta_{\beta i}$ no greater than twenty percent of the total change $\Delta_{\theta t}$ and $\Delta_{\beta t}$, respectively, typically are not evidence of a spoof attack. Consequently, the incremental changes $\Delta_{\theta i}$ and $\Delta_{\beta i}$ are limited to a maximum of twenty percent of the total changes $\Delta_{\theta t}$ and $\Delta_{\beta t}$, respectively. When the incremental changes $\Delta_{\theta i}$ and $\Delta_{\beta i}$ between all sequential frames in the respective signals are at most twenty percent of the total changes $\Delta_{\theta t}$ and $\Delta_{\beta t}$, respectively, the signals 48 and 50 may be used to detect user liveness. Otherwise, the signals 48 and 50 are considered faulty and are not usable for detecting user liveness. If one of the signals 48 or 50 is deemed faulty, the other is also deemed faulty.

Although the example incremental changes $\Delta_{\theta i}$ and $\Delta_{\beta i}$ are limited to a maximum of twenty percent of the total changes $\Delta_{\theta t}$ and $\Delta_{\beta t}$, respectively, the incremental changes $\Delta_{\theta i}$ and $\Delta_{\beta i}$ may alternatively be any percentage of the total changes $\Delta_{\theta t}$ and $\Delta_{\beta t}$, respectively, judged not to be evidence of a spoof attack. Different terminal devices 10 associated with different users may allow for different maximum biometric data capture rates as well as different frame processing rates. To account for such different rates, the percentage of the total changes $\Delta_{\theta t}$ and $\Delta_{\beta t}$, respectively, may be normalized with respect to the frame capture rate of the terminal device 10, or with respect to the frame processing rate of the terminal device 10.

The terminal device 10 calculates a similarity score that reflects the similarity between the signals 48 and 50. Similarity scores equal to or greater than a threshold score indicate the user is live. The similarity score may be calculated as the correlation coefficient between the signals 48 and 50. When the similarity score is calculated as a correlation coefficient, the similarity score ranges between negative one and positive one. Moreover, the similarity score may alternatively be calculated using any appropriate correlation method. The similarity score may be determined in any manner that facilitates enhancing user liveness detection as described herein. The threshold score is 0.70. However, the threshold score may alternatively be any value that facilitates detecting user liveness as described herein.

Figure 8:
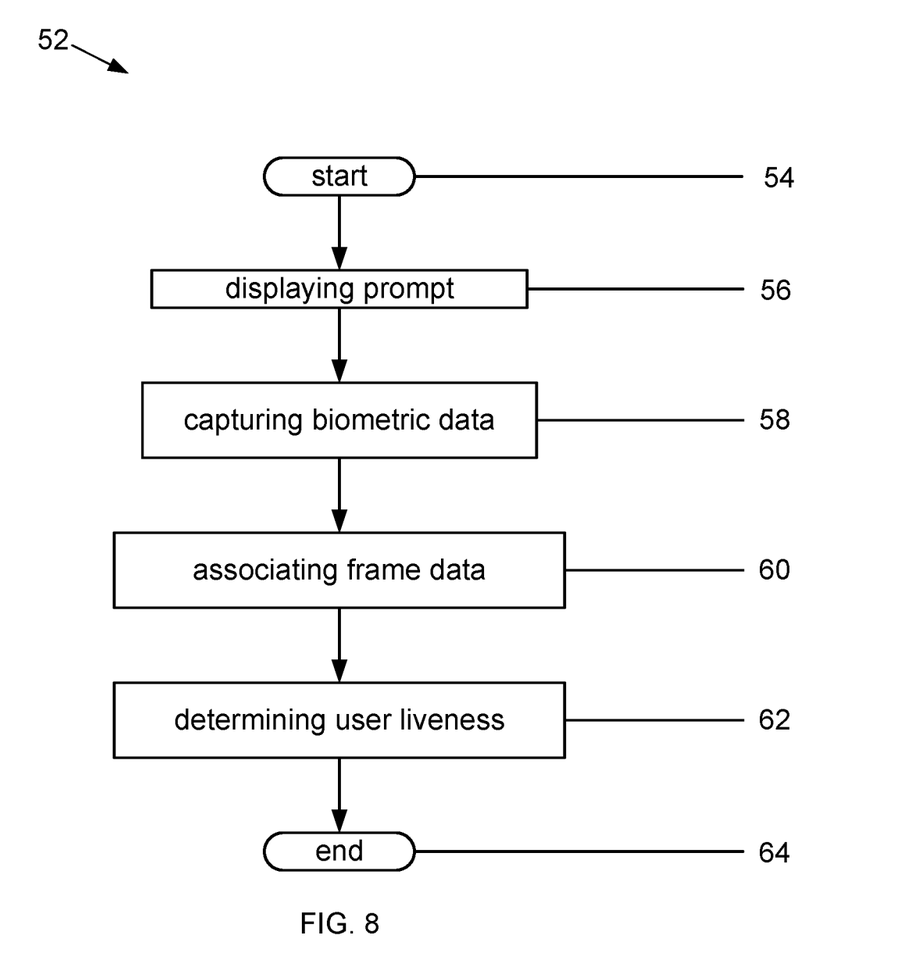
FIG. 8 is a flowchart illustrating an example method for enhancing user liveness detection.

FIG. 8 is a flowchart 52 illustrating an example method for enhancing user liveness detection. A user may be required to prove he or she is live before being permitted to conduct, using the terminal device 10, a network-based transaction. Such transactions include, but are not limited to, buying merchandise from a merchant service provider web site and accessing top secret information from a computer system. The method starts 54 when a user provides a claim of identity using the terminal device 10, and places the terminal device 10 in the first position. The user may provide the claim of identity in any manner, for example, by typing or speaking the claim of identity into the terminal device 10 or selecting an identity from a list of identities. Next, the terminal device 10 continues by displaying 56 a prompt for the user to see. After reading the prompt, the user moves the terminal device 10 in accordance with the prompt while the terminal device 10 captures biometric data 58 from the user as a video.

While the terminal device 10 is moved, the terminal device 10 also generates data for each frame of the video. The terminal device 10 calculates at least the angles $\theta$ and $\beta$ from the generated data. For each frame, the terminal device 10 associates 60 all the frame data as stored in the memory 14 with the angles $\theta$ and $\beta$ calculated for the frame in the memory 14. Next, the terminal device 10 continues by creating at least the signals 48 and 50 and calculating the similarity score between the signals. When the similarity score is equal to or greater than the threshold score, the terminal device 10 determines 62 the user is live. Otherwise, the user is not considered live. Next, a message indicating the user is live, or not, may be transmitted to a service provider computer system operating a website and processing ends 64.

Figure 9:
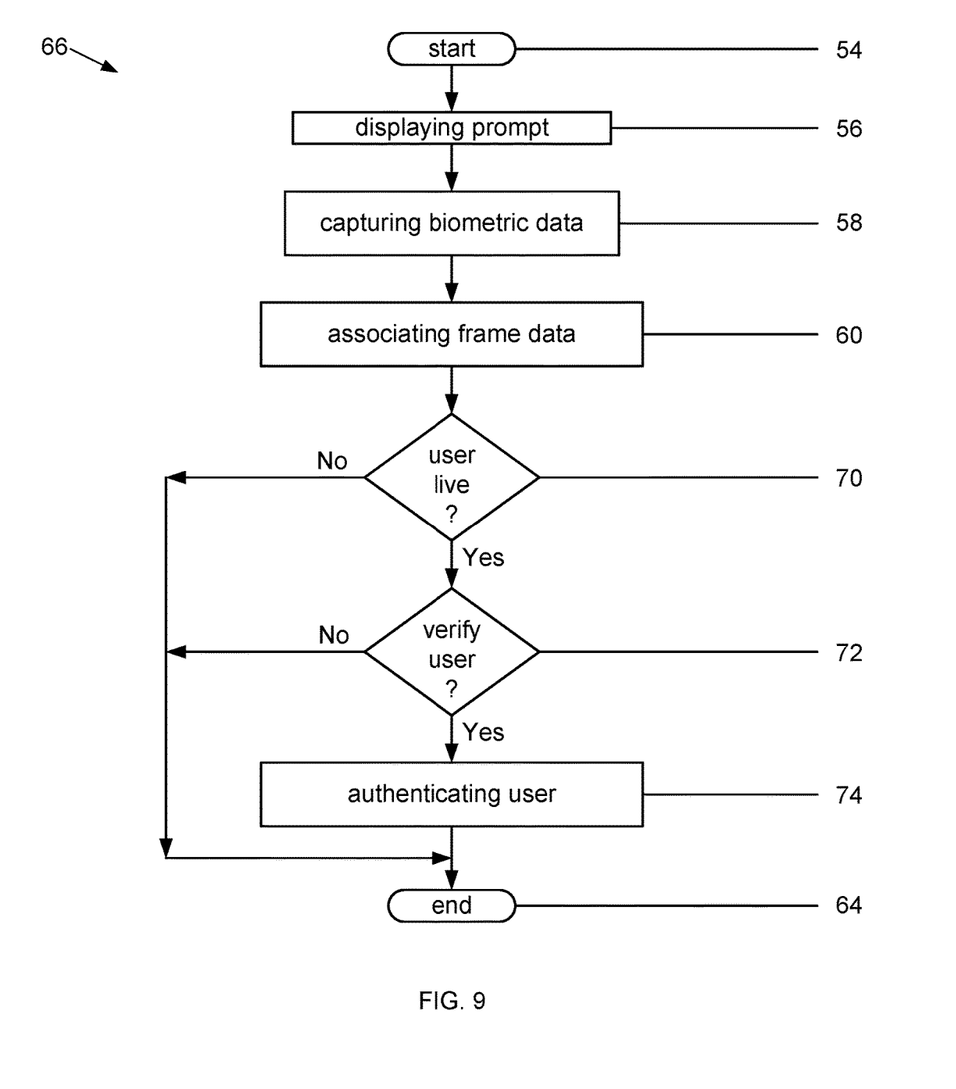
FIG. 9 is a flowchart illustrating another example method for enhancing user liveness detection.

The information shown in FIG. 9 is the same information shown in FIG. 8 as described in more detail below. As such, features illustrated in FIG. 9 that are identical to features illustrated in FIG. 8 are identified using the same reference numerals used in FIG. 8.

FIG. 9 is a flowchart 66 illustrating another example method for enhancing user liveness detection. This alternative example method is similar to that shown in FIG. 8. However, the identity of the user is also required to be verified. Thus, the user is authenticated after being deemed live and after the identity of the user is successfully biometrically verified. More specifically, after conducting operation 60, the terminal device 10 creates at least the signals 48 and 50, calculates the similarity score between the signals, and determines 70 whether or not the user is live. The terminal device 10 compares the calculated similarity score against the threshold score. When the similarity score is less than the threshold score, the terminal device determines that the user is not live and may transmit a message indicating the user is not live to a service provider computer system operating a website. Next, processing ends 64. However, when the similarity score is equal to or greater than the threshold score, the terminal device 10 determines the user is live 70 and continues by verifying 72 the identity of the user.

More specifically, the terminal device 10 continues by obtaining biometric data from any of the video frames captured when the terminal device 10 is in the second position, generating a biometric template from the obtained data, and verifying the identity of the user based on the generated biometric template. When the identity of the user is not verified 72 the user is not successfully authenticated. The terminal device 10 may continue by transmitting a message indicating that the user was not successfully authenticated to a service provider computer system operating a web site. Next, processing ends 64. However, when the identity of the user is verified 72 the user is successfully authenticated. The terminal device 10 may continue by transmitting a message indicating the user was successfully authenticated to a service provider computer system operating a website. Next, processing ends 64.

Figure 10:
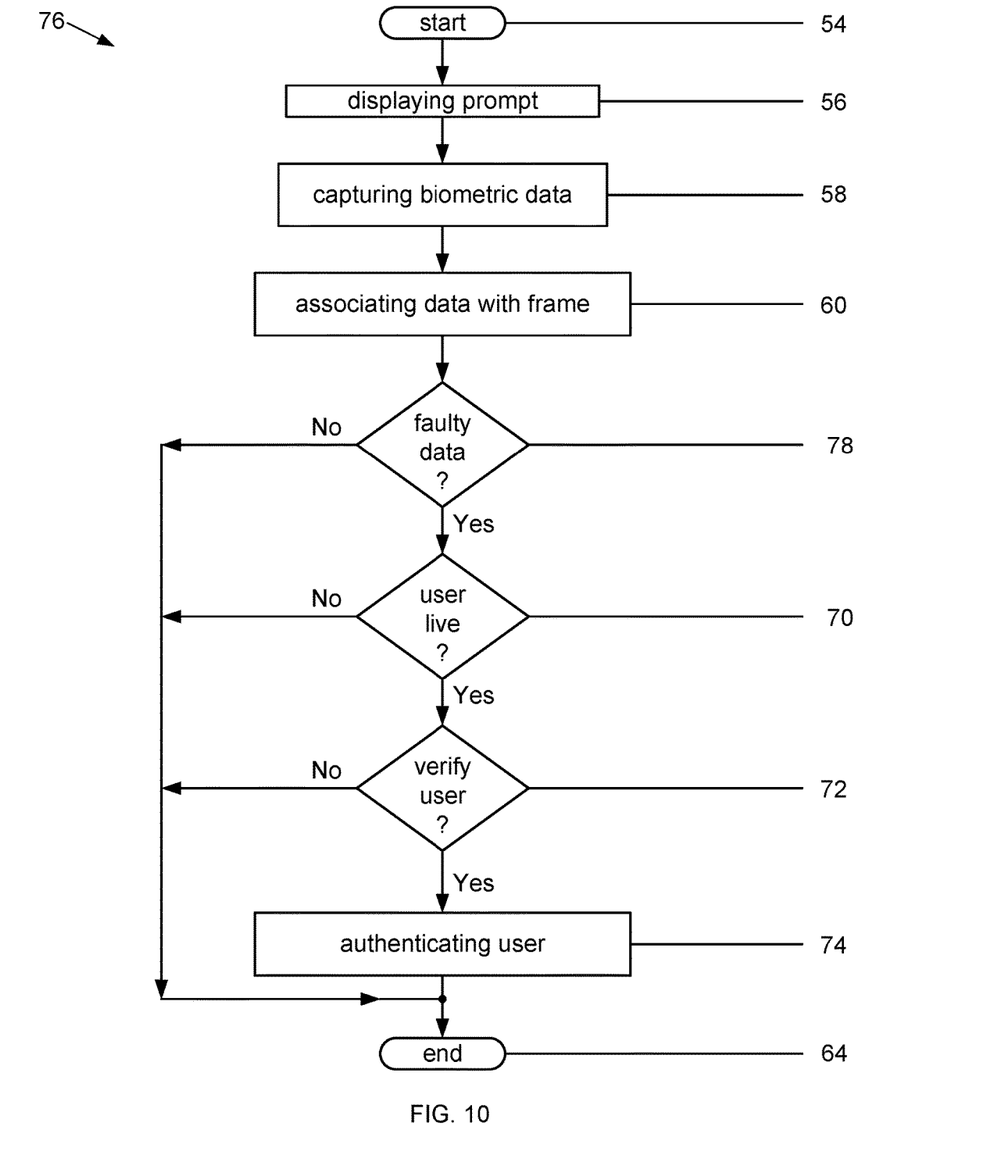
FIG. 10 is a flowchart illustrating yet another example method for enhancing user liveness detection.

The information shown in FIG. 10 is the same information shown in FIG. 9 as described in more detail below. As such, features illustrated in FIG. 10 that are identical to features illustrated in FIG. 9 are identified using the same reference numerals used in FIG. 9.

FIG. 10 is a flowchart 76 illustrating yet another example method for enhancing user liveness detection. This alternative example method is similar to that shown in FIG. 9. However, the calculated angles θ and β are analyzed to determine whether or not the calculated angles are faulty 78 before determining whether or not the user is live 70. More specifically, after conducting operation 60 the terminal device 10 analyzes the calculated angular data (i.e., $\theta_x$, $\theta_y$, $\theta_z$, $\beta_x$, $\beta_y$, $\beta_z$) to verify that the angular data (i.e., $\theta_x$, $\theta_y$, $\theta_z$, $\beta_x$, $\beta_y$, $\beta_z$) can be used to generate trustworthy liveness detection results. When the calculated angular data (i.e., $\theta_x$, $\theta_y$, $\theta_z$, $\beta_x$, $\beta_y$, $\beta_z$) is deemed faulty 78, the terminal device 10 continues by determining the pose of the user is invalid, and processing ends 64. However, when the calculated angular data is deemed usable for generating trustworthy liveness detection results, the terminal device 10 continues by validating the pose of the user and by conducting operations 70, 72, and 74 as described herein with regard to FIG. 9. Next, processing ends 64.

The example methods described herein may be conducted entirely by the terminal device 10, or partly on the terminal device 10 and partly on other devices 34 and systems 36 able to communicate with the terminal device 10 over the network 36. Moreover, data described herein as being stored in the memory 14 may alternatively be stored in any system 32 or device 34 able to communicate with the terminal device 10 over the network 36. Furthermore, the example methods are not limited to use with the specific computer systems and/or devices described herein, but rather, the methods can be utilized independently and separately from other computer systems, devices, and components described herein.

In each example embodiment, the above-described methods and systems for enhancing user liveness detection facilitate increasing the trustworthiness of user liveness detection results and of verification transaction results. More specifically, a user starts capturing face biometric data as a video from his or her self with a terminal device when the terminal device is in a first position. The terminal device captures face biometric data of the user while the user moves the terminal device from the first position to a second position. Moreover, the terminal device calculates data for each frame in the video and associates the calculated data with other data for the respective frame. The calculated data includes various angles. The terminal device generates signals from the calculated data and calculates a similarity score that represents the similarity of the signals. When the similarity score is at least equal to a threshold score, the terminal device concludes the user is live. The terminal device may continue by verifying the identity of the user, and after successfully verifying the identity of the user may authenticate the user. As a result, detection of high definition video playback spoofing attempts is facilitated to be increased, trustworthiness of user liveness detection results is facilitated to be enhanced, and costs incurred due to successful spoofing are facilitated to be reduced.

The example methods for enhancing user liveness detection described above should not be considered to imply a fixed order for performing the method steps. Rather, the method steps may be performed in any order that is practicable, including simultaneous performance of at least some steps. Moreover, the method steps may be performed in real time or in near real time. Furthermore, the invention is not limited to the embodiments of the methods described above in detail. Rather, other variations of the methods may be utilized within the spirit and scope of the claims.

What is claimed is:

1. A method for enhancing user liveness detection comprising:
    calculating, by a terminal device, a first angle and a second angle for each frame in a video of captured face biometric data, the first angle being between a plane defined by a front face of the terminal device and a vertical axis, the second angle being between the plane defined by the front face of the terminal device and a plane defined by the face of the user;
    creating a first signal from the first angles and a second signal from the second angles;
    calculating a similarity score between the first and second signals; and
    determining the user is live when the similarity score is at least equal to a threshold score.

2. The method for enhancing user liveness detection in accordance with claim 1 further comprising:

obtaining biometric data from a frame in the video captured when the similarity score is at least equal to the threshold score;
generating a biometric template from the obtained biometric data;
comparing the generated biometric template against a corresponding user record biometric template; and
verifying the identity of the user when the generated and record templates match.

3. The method for enhancing user liveness detection in accordance with claim 1 further comprising:
verifying the identity of the user based on biometric data obtained from a frame in the video, the frame being captured when the similarity score is at least equal to the threshold score; and
successfully authenticating the user.

4. The method for enhancing user liveness detection in accordance with claim 1 further comprising:
analyzing the first and second calculated angles to verify the angles are usable for detecting user liveness; and
validating a pose of the user when the calculated angles are usable for detecting user liveness.

5. The method for enhancing user liveness detection in accordance with claim 1 further comprising:
analyzing face data included in the captured biometric data to detect anomalies; and
validating the pose of the user when anomalies are not detected.

6. The method for enhancing user liveness detection in accordance with claim 1 further comprising:
calculating an incremental change between all sequential frames of the first and second signals; and
determining whether or not the signals are faulty based on the incremental changes.

7. A terminal device for enhancing user liveness detection comprising:
a processor; and
a memory configured to store data, said terminal device being associated with a network and said memory being in communication with said processor and having instructions stored thereon which, when read and executed by said processor, cause said terminal device to:
calculate a first angle and a second angle for each frame in a video of captured face biometric data, the first angle being between a plane defined by a front face of said terminal device and a vertical axis, the second angle being between the plane defined by the front face of said terminal device and a plane defined by the face of the user;
create a first signal from the first angles and a second signal from the second angles;
calculate a similarity score between the first and second signals; and
determine the user is live when the similarity score is at least equal to a threshold score.

8. The terminal device for enhancing user liveness detection in accordance with claim 7, wherein the instructions when read and executed by said processor, cause said terminal device to:
obtain biometric data from a frame in the video captured when the similarity score is at least equal to the threshold score;
generate a biometric template from the obtained biometric data;
compare the generated biometric template against a corresponding user record biometric template; and
verify the identity of the user when the generated and record templates match.

9. The terminal device for enhancing user liveness detection in accordance with claim 7, wherein the instructions when read and executed by said processor, cause said terminal device to:
analyze the first and second calculated angles to verify the angles are usable for detecting user liveness; and
validate a pose of the user when the calculated angles are usable for detecting user liveness.

10. The terminal device for enhancing user liveness detection in accordance with claim 7, wherein the instructions when read and executed by said processor, cause said terminal device to:
analyze face data included in the captured biometric data to detect anomalies; and
validate the pose of the user when anomalies are not detected.

11. The terminal device for enhancing user liveness detection in accordance with claim 7, wherein the instructions when read and executed by said processor, cause said terminal device to:
verify the identity of the user based on biometric data obtained from a frame in the video, the frame being captured when the similarity score is at least equal to the threshold score; and
successfully authenticate the user.

12. The terminal device for enhancing user liveness detection in accordance with claim 7, wherein the instructions when read and executed by said processor, cause said terminal device to:
calculate an incremental change between all sequential frames of the first and second signals; and
determine whether or not the signals are faulty based on the incremental changes.

13. A computer program recorded on a non-transitory computer-readable recording medium included in a terminal device for enhancing user liveness detection results, the computer program being comprised of instructions, which when read and executed by the terminal device, cause the terminal device to:
calculate a first angle and a second angle for each frame in a video of captured face biometric data, the first angle being between a plane defined by a front face of the terminal device and a vertical axis, the second angle being between the plane defined by the front face of the terminal device and a plane defined by the face of the user;
create a first signal from the first angles and a second signal from the second angles;
calculate a similarity score between the first and second signals; and
determine the user is live when the similarity score is at least equal to a threshold score.

14. A computer program in accordance with claim 13 further comprising instructions, which when read and executed by the terminal device cause the terminal device to:
obtain biometric data from a frame in the video captured when the similarity score is at least equal to the threshold score;
generate a biometric template from the obtained biometric data;
compare the generated biometric template against a corresponding user record biometric template; and
verify the identity of the user when the generated and record templates match.

15. A computer program in accordance with claim 13 further comprising instructions, which when read and executed by the terminal device cause the terminal device to:
   analyze the first and second calculated angles to verify the angles are usable for detecting user liveness; and
   validate a pose of the user when the calculated angles are usable for detecting user liveness.

16. A computer program in accordance with claim 13 further comprising instructions, which when read and executed by the terminal device cause the terminal device to:
   analyze face data included in the captured biometric data to detect anomalies; and
   validate the pose of the user when anomalies are not detected.

17. A computer program in accordance with claim 13 further comprising instructions, which when read and executed by the terminal device cause the terminal device to:
   verify the identity of the user based on biometric data obtained from a frame in the video, the frame being captured when the similarity score is at least equal to the threshold score; and
   successfully authenticate the user.

18. A computer program in accordance with claim 13 further comprising instructions, which when read and executed by the terminal device cause the terminal device to:
   calculate an incremental change between all sequential frames of the first and second signals; and
   determine whether or not the signals are faulty based on the incremental changes.

* * * * *